US009805537B2

(12) United States Patent
Kunori

(10) Patent No.: US 9,805,537 B2
(45) Date of Patent: Oct. 31, 2017

(54) INFORMATION PROCESSING APPARATUS COMMUNICATING WITH EXTERNAL DEVICE VIA NETWORK, AND CONTROL METHOD OF THE INFORMATION PROCESSING APPARATUS

(75) Inventor: Shiro Kunori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/464,771

(22) Filed: May 4, 2012

(65) Prior Publication Data

US 2012/0287064 A1 Nov. 15, 2012

(30) Foreign Application Priority Data

May 10, 2011 (JP) ................................ 2011-105414

(51) Int. Cl.
*G07F 7/10* (2006.01)
*G06F 3/0488* (2013.01)

(52) U.S. Cl.
CPC .......... *G07F 7/1033* (2013.01); *G06F 3/0488* (2013.01)

(58) Field of Classification Search
CPC .... G06F 3/0238; G06F 3/0489; G06F 3/0488; G07F 7/1033
See application file for complete search history.

(56) References Cited

U.S. PATENT DOCUMENTS

| | | | | |
|---|---|---|---|---|
| 6,747,676 | B2 * | 6/2004 | Botz et al. | 715/741 |
| 7,003,727 | B2 * | 2/2006 | Rosar | 715/741 |
| 7,107,147 | B2 * | 9/2006 | Pascual et al. | 701/538 |
| 7,215,258 | B2 * | 5/2007 | Wormald | 341/23 |
| 7,240,339 | B2 * | 7/2007 | Cragun et al. | 717/143 |
| 7,337,410 | B2 * | 2/2008 | Lin | 715/773 |
| 7,453,438 | B2 * | 11/2008 | Okamura | 345/156 |
| 7,916,701 | B1 * | 3/2011 | Viswanath | H04L 12/5691 370/338 |
| 7,949,879 | B2 * | 5/2011 | Waterland | 713/183 |
| 8,161,395 | B2 * | 4/2012 | Girgaonkar | 715/741 |
| 8,226,308 | B1 * | 7/2012 | Borg | G06F 3/0216 341/22 |
| 8,327,287 | B2 * | 12/2012 | Kuroume et al. | 715/780 |
| 8,423,899 | B1 * | 4/2013 | Crane et al. | 715/780 |

(Continued)

FOREIGN PATENT DOCUMENTS

| | | |
|---|---|---|
| CN | 1673931 A | 9/2005 |
| JP | H09-102840 A | 4/1997 |

(Continued)

*Primary Examiner* — Sejoon Ahn
(74) *Attorney, Agent, or Firm* — Canon U.S.A., Inc. IP Division

(57) ABSTRACT

When an information processing apparatus connected to an external device via a network respectively displays an operation screen on an operation unit provided thereto and on the external device, the information processing apparatus changes display of a touched key with highlighting or without highlighting according to whether confidential information such as a password is entered. Depending on the entry on the operation unit, whether to display a character on the operation unit or not is determined. If the character is to be displayed, the highlighting of the character is not performed. If the character is not to be displayed, the highlighting of the character is performed.

12 Claims, 10 Drawing Sheets

(56) References Cited

U.S. PATENT DOCUMENTS

| | | | | |
|---|---|---|---|---|
| 2001/0006904 | A1* | 7/2001 | Cha | G06F 3/0219 455/566 |
| 2003/0014239 | A1* | 1/2003 | Ichbiah | G06F 3/0233 704/7 |
| 2004/0075648 | A1* | 4/2004 | Koch et al. | 345/168 |
| 2004/0210658 | A1* | 10/2004 | Guillermo et al. | 709/227 |
| 2005/0035949 | A1* | 2/2005 | Beck | G06F 3/02 345/168 |
| 2005/0091431 | A1* | 4/2005 | Olodort | G06F 1/162 710/72 |
| 2005/0134573 | A1* | 6/2005 | Pearson | B41J 2/2052 345/172 |
| 2005/0162402 | A1 | 7/2005 | Watanachote | |
| 2005/0212763 | A1 | 9/2005 | Okamura | |
| 2006/0022951 | A1* | 2/2006 | Hull | 345/170 |
| 2007/0006287 | A1* | 1/2007 | Noda | H04L 63/08 726/4 |
| 2007/0097076 | A1* | 5/2007 | Gross | 345/163 |
| 2007/0097085 | A1* | 5/2007 | Iwatsuki | 345/173 |
| 2007/0139382 | A1 | 6/2007 | Kotipalli | |
| 2007/0222757 | A1* | 9/2007 | Tsai | G06F 1/3203 345/168 |
| 2008/0115078 | A1 | 5/2008 | Girgaonkar | |
| 2008/0316183 | A1* | 12/2008 | Westerman | G06F 3/0416 345/173 |
| 2009/0073115 | A1* | 3/2009 | Chen et al. | 345/157 |
| 2009/0117944 | A1* | 5/2009 | Lee et al. | 455/566 |
| 2009/0146947 | A1* | 6/2009 | Ng | 345/156 |
| 2009/0150776 | A1* | 6/2009 | Feldman et al. | 715/702 |
| 2009/0150777 | A1* | 6/2009 | Feldman et al. | 715/702 |
| 2009/0153562 | A1* | 6/2009 | Nishimura | 345/467 |
| 2010/0033439 | A1* | 2/2010 | Kodimer et al. | 345/173 |
| 2010/0205529 | A1* | 8/2010 | Butin | G06F 9/4446 715/704 |
| 2010/0231523 | A1* | 9/2010 | Chou | G06F 3/018 345/171 |
| 2010/0265183 | A1* | 10/2010 | Mail et al. | 345/168 |
| 2010/0273539 | A1* | 10/2010 | Lee | H04M 1/0274 455/575.3 |
| 2010/0281416 | A1* | 11/2010 | Fuyuno | 715/773 |
| 2010/0309147 | A1* | 12/2010 | Fleizach et al. | 345/173 |
| 2010/0309148 | A1* | 12/2010 | Fleizach et al. | 345/173 |
| 2011/0037720 | A1* | 2/2011 | Hirukawa et al. | 345/173 |
| 2011/0074685 | A1* | 3/2011 | Causey et al. | 345/168 |
| 2011/0148787 | A1* | 6/2011 | Kim | 345/173 |
| 2011/0205179 | A1* | 8/2011 | Braun | 345/174 |
| 2011/0216021 | A1* | 9/2011 | Maeda | 345/173 |
| 2011/0221693 | A1* | 9/2011 | Miyazaki | 345/173 |
| 2011/0225219 | A1* | 9/2011 | Midorogi | G06F 15/0225 708/168 |
| 2011/0248948 | A1* | 10/2011 | Griffin | 345/174 |
| 2012/0007841 | A1* | 1/2012 | Nakamura et al. | 345/204 |
| 2012/0050197 | A1* | 3/2012 | Kemmochi | 345/173 |
| 2012/0050307 | A1* | 3/2012 | Mahowald et al. | 345/590 |
| 2012/0105352 | A1* | 5/2012 | Griffin | 345/173 |
| 2012/0281127 | A1* | 11/2012 | Marino et al. | 348/333.01 |
| 2013/0097548 | A1* | 4/2013 | Yang | G06F 3/0238 715/773 |
| 2013/0125035 | A1* | 5/2013 | Griffin et al. | 715/773 |
| 2013/0127911 | A1* | 5/2013 | Brown | 345/649 |
| 2013/0214994 | A1* | 8/2013 | Tsuda et al. | 345/1.1 |
| 2013/0321340 | A1* | 12/2013 | Seo et al. | 345/174 |

FOREIGN PATENT DOCUMENTS

| | | | |
|---|---|---|---|
| JP | 2005-100186 | A | 4/2005 |
| JP | 2005-284375 | A | 10/2005 |
| JP | 2007-156981 | A | 6/2007 |
| JP | 2010-049417 | A | 3/2010 |
| KR | 10-2006-0044790 | A | 5/2006 |

* cited by examiner

FIG. 8

| SOFT KEY | ASSOCIATED SOFT KEY |
|---|---|
| a | a, b, c,d |
| b | a, b, c,d |
| c | a, b, c,d |
| d | a, b, c,d |
| e | e, f, g, h |
| f | e, f, g, h |

INFORMATION PROCESSING APPARATUS COMMUNICATING WITH EXTERNAL DEVICE VIA NETWORK, AND CONTROL METHOD OF THE INFORMATION PROCESSING APPARATUS

BACKGROUND OF THE INVENTION

Field of the Invention

The present invention relates to an information processing apparatus that can communicate with an external device via a network. More particularly, the present invention relates to the information processing apparatus that can output data on an operation screen on which soft keys are arranged using Virtual Network Computing (VNC) to an operation unit and an external device.

Description of the Related Art

Recently, using the technology called Virtual Network Computing (VNC from AT&T Laboratories Cambridge), data on an operation screen displayed on a display of an information processing apparatus can be output to a remote device (external device) connected via a network, and displayed thereon. According to another technology, a soft keyboard (also referred to as a software keyboard, a virtual keyboard, or a screen keyboard) is displayed on a display, and a user can input a character to an information processing apparatus by touching a soft key on the soft keyboard. Further, when a user touches a soft key using the soft keyboard, a character corresponding to the touched soft key is displayed on the display, and also the touched soft key itself can be highlighted, for example, the color of the toughed soft key can be changed. The highlighted soft key help the user check whether the soft key is properly touched.

When the VNC technology is used, if the soft key is touched on the soft keyboard displayed by the information processing apparatus, the soft key is also highlighted on a display of the external device being connected using the VNC similarly to the information processing apparatus. Consequently, the soft key is highlighted on the device (a remote external device connected using the VNC) whose soft keyboard is not operated. As a result, a user operating the external device can easily see which soft key is operated.

To solve such an issue, Japanese Patent Application Laid-Open No. 2005-284375 discusses a technique for not highlighting an operated soft key when highly-confidential information such as a password is entered. However, the information processing apparatus discussed in Japanese Patent Application Laid-Open No. 2005-284375 does not selectively perform the highlighting of the soft key touched by the user based on a type thereof.

SUMMARY OF THE INVENTION

The present invention is directed to enabling a user to selectively perform highlighting of a soft key touched by a user based on a type thereof.

According to an aspect of the present invention, an information processing apparatus capable of communicating with an external device via a network, the information processing apparatus includes an operation unit, and an output unit configured to output data on an operation screen on which a plurality of soft keys are arranged for entering secret information to the operation unit and the external device, wherein, in a case where a soft key touched by a user via the operation screen is a first soft key entering one character in response to a touch of the soft key, the output unit outputs data on the operation screen on which information enabling the user to visually recognize that one of the plurality of soft keys arranged on the operation screen is operated without highlighting the first soft key, and in a case where a soft key operated by the user via the operation screen is a second soft key entering one character in response to the touch of the soft key and another soft key, the output unit outputs data on the operation screen on which the second soft key is highlighted.

According to an aspect of the present invention, a user can confirm a touch of a soft key, and in an external device connected using the VNC, a character entered by the user cannot be specified.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates a table for managing characters associated with characters of touched soft keys.

DESCRIPTION OF THE EMBODIMENTS

Various exemplary embodiments, features, and aspects of the invention will be described in detail below with reference to the drawings.

Figure 1:
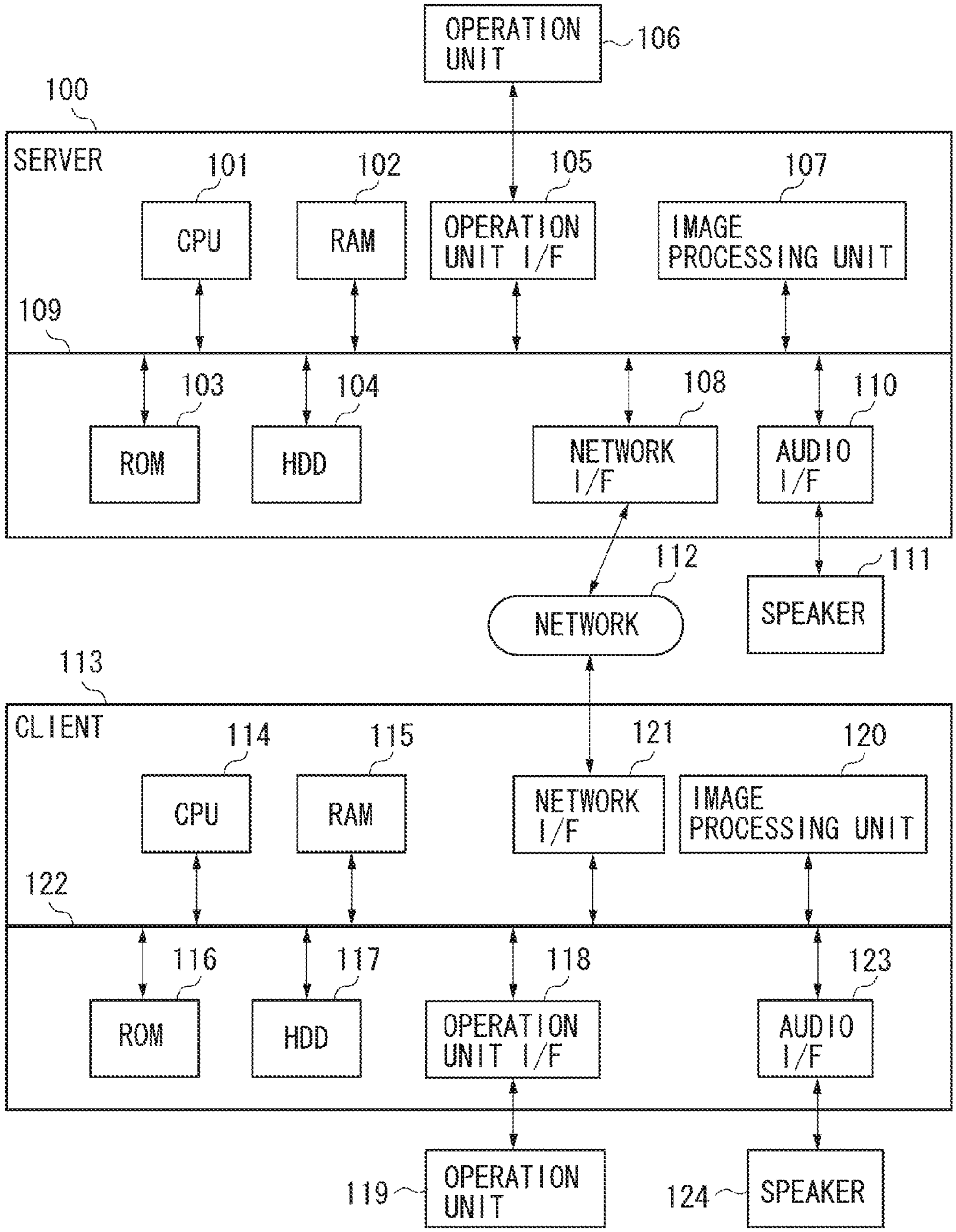
FIG. 1 is a block diagram illustrating a hardware configuration of an information processing system in which a first information processing apparatus and a second information processing apparatus are interconnected.

FIG. 1 is an overall view illustrating an information processing system according to a first exemplary embodiment. In the information processing system, an information processing apparatus 100 and an information processing apparatus 113 are communicatively connected with each other via a network 112. In the information processing system, an image (display image) to be displayed on an operation unit 106 in the information processing apparatus 100 can be transmitted to the information processing apparatus 113 and displayed thereon with use of the technique referred to as VNC. In the description below, the information processing apparatus 100 that is an apparatus which transmits a display image is referred to as a "server". The information processing apparatus 113 that is an apparatus which receives the display image is referred to as a "client". Using the above-described VNC, a user operating the client 113 can see the same screen being displayed on the server 100.

<Internal Configuration of Server>

A hardware configuration of the server 100 is described with reference to FIG. 1.

A central processing unit (CPU) 101 reads a control program stored in a read-only memory (ROM) 103, and executes various types of control processes. Software for the above-described VNC server is also stored in a hard disk drive (HDD) 104. A random access memory (RAM) 102 serves as a temporary storage area for a main memory, a work area, or the like of the CPU 101. A part of the RAM 102 can be also used as a virtual video random access memory (VRAM). The VRAM serves as a storage area for storing information for displaying a screen to be displayed on an operation unit 106. The HDD 104 stores the above-described various types of control programs, and also stores information about image data and all communication units included in a network interface (I/F) 108 that is described below.

The CPU 101, the RAM 102, the ROM 103, and the HDD 104 are connected with each other via a system bus 109. Further, the CPU 101 is also connected to an operation unit interface (I/F) 105, an image processing unit 107, a network I/F 108, and an audio I/F 110 via the system bus 109. The operation unit I/F 105 is an interface unit between the operation unit (display) 106 and the CPU 101. The operation unit I/F 105 acquires image data to be displayed on the operation unit 106 from the RAM 102 and transfers the data to the operation unit 106, and transfers a signal generated in the operation unit 106 to the CPU 101.

The operation unit 106 performs display processing of a soft key for entering a character or a symbol, and entry processing for detecting a signal indicating that the user selected the information displayed on the display unit. An image processing unit 107 generates screen information to be displayed on the operation unit 106, generates and edits image data to be transmitted or received via the network I/F 108, and performs compression/decompression processing of the image data. All of the image data pieces used in the image processing unit 107 are stored in the HDD 104 or the RAM 102.

The network I/F 108 is connected to a network 112 such as a local area network (LAN), and performs input and output of information between a device (client) and the CPU 101 via the network 112. In FIG. 1, only one client 113 is connected, however, a plurality of clients can be connected. The audio I/F 110 serves as an interface unit between a speaker 111 and the CPU 101. The audio I/F 110 performs processing for generating sound to be output from the speaker, and output processing. The server 100 may be a digital multi-function peripheral which includes a scanner and a printer and can implement a copying function, a printing function, or a scanning function.

In the present exemplary embodiment, a hardware configuration of the client 113 is similar to that of the above-described server 100, and only reference numerals attached to the units in the drawing differ from those in the server 100. Therefore, the descriptions thereof are omitted. However, it is noted that an HDD 117 in the client 113 stores software for the VNC client.

<Control of Operation Unit 106 by CPU 101>

Figure 2:
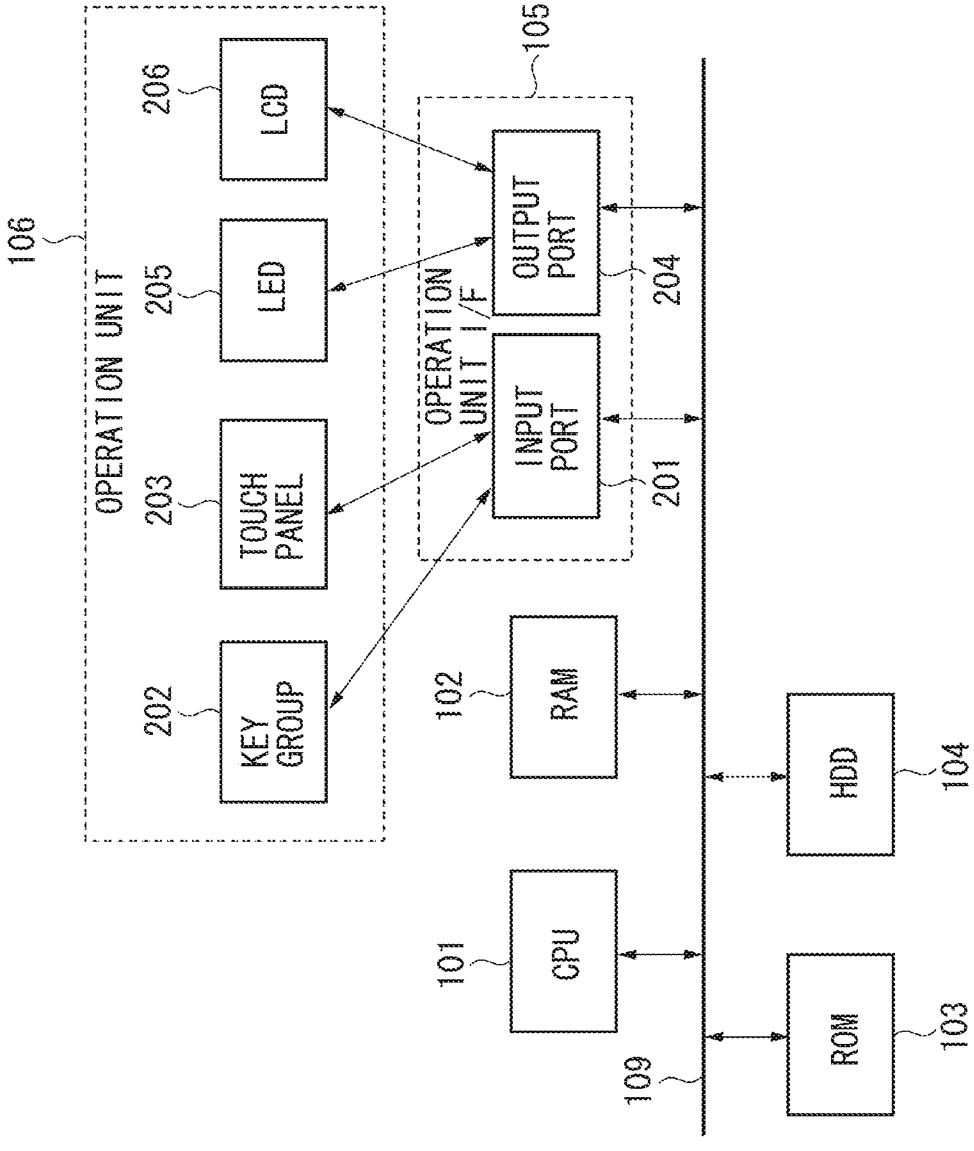
FIG. 2 is a block diagram illustrating an operation unit and its peripheral units in each of the information processing apparatuses.

FIG. 2 is a block diagram illustrating a configuration of the operation unit 106 and peripheral units thereof in FIG. 1. A touch panel 203 and a key group 202 of hard keys in the operation unit 106 are connected to the CPU 101 via an input port 201 in the operation unit I/F 105. Positional information indicating a touch position of the touch panel 203 and key information corresponding to the touch of the key group 202 are input to the CPU 101 via the input port 201.

A light-emitting diode (LED) 205 and a liquid crystal display (LCD) 206 in the operation unit 106 are connected to the CPU 101 via an output port 204 in the operation unit I/F 105. Lighting of the LED 205 and display of the LCD 206 are controlled by the CPU 101.

Generally, the touch panel 203 is a sheet-shape transparent pressure-sensitive device and disposed over the LCD 206. When a user touches an area on the touch panel corresponding to an operation object (hereinafter, referred to as a "soft key") such as a virtual button displayed on the LCD 206 (hereinafter, expressed as "touch a soft key"), the touch panel 203 detects the positional information (coordinates) of the area.

When the positional information is detected, the CPU 101 detects what is the operation object (soft key) touched by the user based on the object being displayed on the LCD 206 and the coordinates thereof. The CPU 101 selects a command to be executed in response to the touch of the detected operation object (soft key) from among commands stored in the ROM 103 or the HDD 104 in advance, generates screen data corresponding to the touched soft key as necessary, and displays the screen data on the LCD 206. The screen data is transmitted to the LCD 206 via the output port 204 by the CPU 101, so that the CPU 101 can change the display on the operation unit 106. Further, the CPU 101 transmits the screen data also to the client 113 via the network 112.

The above-described internal processing in the LCD 206 performed by the user operation is commonly performed in all the following description, and accordingly, the description thereof is omitted in the following description. Further, in the following description, unless otherwise clearly specified, the CPU 101 performs all execution processing and determination, and setting values, results of the execution processing, and states of the system are stored in the HDD 104.

<Description of Soft Keyboard Screen>

Figure 3:
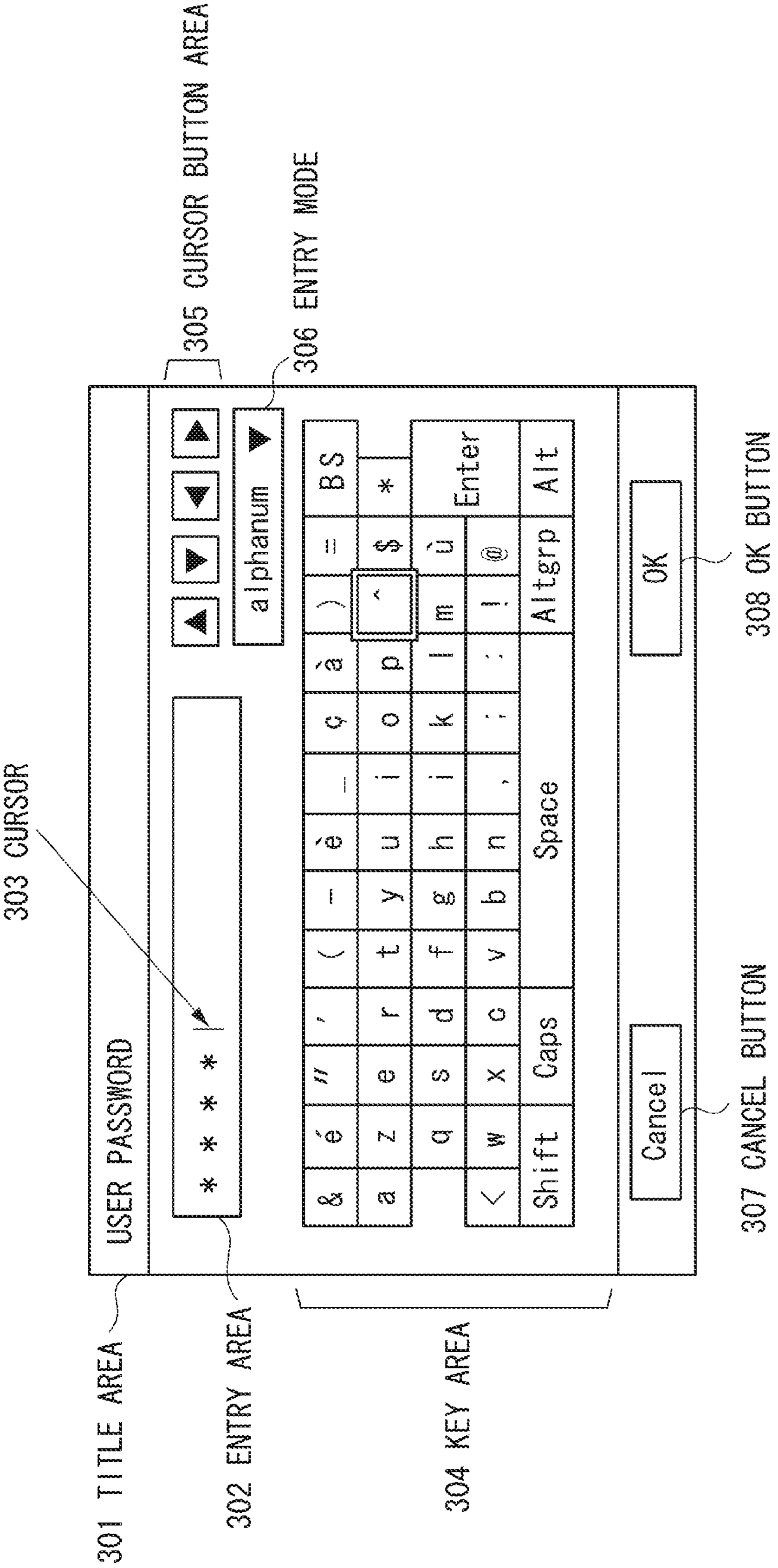
FIG. 3 illustrates an example of a soft keyboard screen displayed on the operation unit in the information processing apparatus.

FIG. 3 illustrates an example of a soft keyboard screen (a screen virtually displaying a keyboard) commonly displayed on the LCDs 206 in the operation unit 106 of the server 100 and in the operation unit 119 of the client 113 according to the present exemplary embodiment. The soft keyboard screen includes a title area 301. The title area 301 displays information showing the user the purpose a character or a character string to be entered with the soft keyboard. In the example in FIG. 3, "USER PASSWORD" is displayed in the title area to indicate that the soft keyboard screen is for the user to enter a password. In the present exemplary embodiment, as an example for entering confidential information, entry of a password is described. Alternatively, the present exemplary embodiment can be applied to a configuration for entering information containing private information, or a configuration for entering a serial number, a path name of a folder, or other confidential information.

The soft keyboard screen includes an entered character display area 302. The entered character display area 302 displays a character string entered by the user touching soft keys in a key area 304 or the like. (The processing is described below in detail.) The soft keyboard screen includes the key area 304. The key area 304 displays soft keys indicating characters, symbols, a Shift key, and the like, that can be entered. In the present exemplary embodiment, in the key area 304 in FIG. 3, the frame of the soft key [ˆ] is surrounded by the double line to indicate that the key is a dead key. The indication of the dead key is not limited to this method. Alternatively, the background color of the dead key may be changed, or nothing may be displayed until the dead key is entered.

The soft keyboard screen also includes a cancel button 307. In response to a touch of the cancel button 307, the contents entered on the soft keyboard screen is canceled, and the screen is returned to the previous screen that was displayed before the soft keyboard screen is displayed. The soft keyboard screen also includes an OK button 308. In response to a touch of the OK button 308, a character string entered on the soft keyboard screen is stored in the HDD 104, and the screen is returned to the previous screen that was displayed before the soft keyboard screen is displayed. The soft keyboard screen also includes a cursor button area 305. The cursor button area 305 displays buttons for moving a cursor 303 (cursor 303 indicating a position at which the user enters data) displayed on the entered character display area 302. In FIG. 3, four buttons of up, down, right, and left are displayed.

The soft keyboard screen further includes an entry mode 306. In response to a touch of the entry mode 306, an entry mode pull-down menu (not illustrated) for changing entry methods, such as [alphanum], [fixed phrase], and [Roman character], is displayed. By specifying an entry mode from the pull-down menu, the user can change the entry method and the content to be displayed on the key area 304. For example, as illustrated in FIG. 3, the [alphanum] entry mode is for entering commonly-used alphabets and symbols. If the entry mode is changed to the [fixed phrase] entry mode, a fixed phrase (not illustrated) stored in the HDD 104 in advance is displayed on the key area 304.

The soft keyboard screen can be opened with different keyboard settings according to a setting in the server 100 or a setting specified via the previous screen before the soft keyboard screen is displayed. The CPU 101 reads the keyboard setting corresponding to the situation from the HDD 104, and opens the soft keyboard screen according to the read keyboard setting. The keyboard settings include characters to be displayed on the title area 301, and the entry modes to be displayed on the entry mode 306. These settings are stored in the HDD 104 for each soft keyboard screen. The keyboard settings also include a password flag indicating whether the soft keyboard screen requires entering of a password. The password flag is also stored in the HDD 104.

A difference in operations between a case where the password flag is invalid and a case where the password flag is valid is described.

In a case where the password flag is invalid, when a soft key displayed on the key area 304 is touched, the CPU 101 extracts a character corresponding to the touched key from the HDD 104. For example, when the soft key [a] is touched, the CPU 101 extracts the character "a". The CPU 101 directly displays the extracted character on the entered character display area 302 while the CPU 101 stores the extracted character in the HDD 104. For example, when the key [a] and the key [b] are entered, the CPU 101 stores a character string "ab" in the HDD 104, and displays the character string "ab" in the entered character display area 302. In this specification, for convenience, the characters displayed on the soft keys on the soft keyboard screen are described in square brackets [ ], and a character (or character string) to be displayed in the entered character display area

302 on the operation screen, or a character (character string) to be stored in the HDD 104 is described in quotation marks " ".

In a case where the password flag is valid, when a soft key displayed in the key area 304 is touched, the CPU 101 extracts a character corresponding to the touched key from the HDD 104. The CPU 101 displays the character "*" on the entered character display area 302 while storing the extracted character in the HDD 104. For example, when the key [a], the key [b], the key [c], and the key [d] are entered, the CPU 101 stores a character string "abcd" in the HDD 104, and displays a character string "**" in the entered character display area 302 as illustrated in FIG. 3**.

In the description below, the soft keyboard screen on which the password flag is valid is referred to as a password soft keyboard screen.

<Highlighting Processing when Soft Key is Touched on Soft Keyboard Screen>

Figure 4:
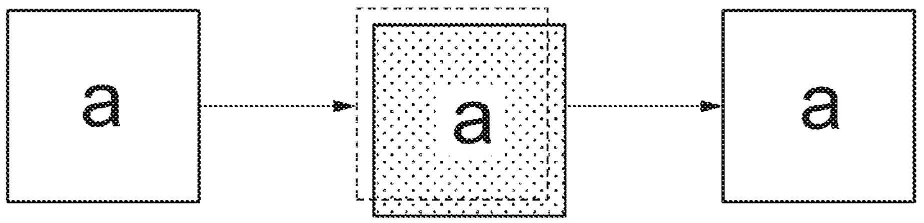
FIG. 4 illustrates key animation processing of a soft key in soft key entry processing.

With reference to FIG. 4, an example of the highlighting to be performed when a soft key displayed on the soft keyboard screen is touched is described in detail. The highlighting is performed to enable a user to clearly identify a touched soft key. For this purpose, various methods can be employed. In the present exemplary embodiment, as an example, the highlighting can be implemented by key animation processing described below.

As described above in the description <Control of operation unit 106 by CPU 101>, the CPU 101 executes a command stored in the ROM 103 or the HDD 104 in advance in response to a detection of the positional information of a key touched by the user. In a case of the soft key on the soft keyboard screen, the command includes the processing for storing the character corresponding to the touched soft key in the HDD 104 and the key animation processing. The key animation processing is an operation for changing an image expressing a soft key existing at a touched position into another image for a moment, displaying the changed image, and displaying the original image expressing the soft key again.

A specific example is described with reference to FIG. 4 illustrating an operation of the soft key [a] displayed in the key area 304 on the soft keyboard screen. In response to a touch of the soft key [a], the CPU 101 deletes the image expressing the soft key [a] (illustrated by the dotted line in FIG. 4), displays another image (an image of the soft key [a] with color displayed on a lower right position of the soft key [a] illustrated by the dotted), and then quickly displays the original image of the soft key [a]. Such processing is referred to as the key animation processing. In this specification, unless otherwise clearly specified, when a soft key displayed on the operation unit 106 and the operation unit 119 is touched, the key animation processing is always performed.

The key animation processing described in the present exemplary embodiment is one example of the highlighting performed on a soft key. A soft key may be highlighted by another method. Further, another configuration that enables a user to confirm a touch of a soft key can be applied other than the highlighting.

<Processing in Change in Operation Unit 106 (Processing in Change in Server)>

Internal processing for displaying the same screen on the operation unit 106 at the server side and on the operation unit 119 at the client side is described. The processing for displaying the same screen on the operation unit 106 and on the operation unit 119 is separately described; processing in changing in the operation unit 106, and processing in changing in the operation unit 119.

In a case where the client 113 is connected to the server 100, when the image information displayed on the operation unit 106 in the server 100 is changed by a user operation or a system condition, the image information on the operation unit 119 in the client 113 is similarly changed.

If the CPU 101 determines to change the image information displayed on the operation unit 106, based on the operation performed by the user on the operation unit 106 or the information stored in the HDD 104, the CPU 101 forms an image to be displayed on the operation unit 106 by the image processing unit 107, and stores the image in the RAM 102. The CPU 101 transmits the image stored in the RAM 102 to the client 113 via the network I/F 108 while the CPU 101 displays the image stored in the RAM 102 on the operation unit 106.

When the CPU 114 detects the reception of the image data in the network I/F 121, the CPU 114 stores the image in a virtual VRAM in the RAM 115, and displays the image stored in the virtual RAM on the operation unit 119 by transmitting the image to the operation unit I/F 118.

<Processing in Change in Operation Unit 119 (Processing in Change in Client)>

In a case where the client 113 is connected to the server 100, when the user operates (touches) the operation unit 119 in the client 113, image information in the operation unit 106 in the server 100 is changed by the following processing.

When the CPU 114 detects an event in the operation unit 119 generated by the user operation (touch event of the operation unit 119), the CPU 114 transmits the event to the operation unit I/F 118. When the CPU 114 detects the reception of the event in the operation unit I/F 118, the CPU 114 transmits the event to the network I/F 108 in the server 100 connected via the network I/F 121. Although, various types of information indicating the user operation can be provided, in the present exemplary embodiment, the coordinates touched by the user on the operation unit 119 is transmitted as the touch event.

When the CPU 101 detects the reception of the touch event in the network I/F 108, the CPU 101 detects the touched coordinates from the received touch event. The CPU 101 changes the screen information to be displayed on the operation unit 106 similarly to the processing performed when the operation unit 106 is touched by the user operation.

More specifically, based on the object currently displayed on the LCD 206 and the received touch coordinates, the CPU 101 detects what is the operation target touched by the user. Then, the CPU 101 detects a command to be executed from the HDD 104, and changes the screen information by executing the command. Similarly to the above-described <Processing in change in operation unit 106>, the CPU 101 transmits the image information in the virtual VRAM in the RAM 102 in the server 100 to the VRAM in the RAM 115 in the client 113, so that the same contents as on the operation unit 106 can be displayed on the operation unit 119.

In the above-described system, a specific example of the key entry for increasing the operability while preventing information leakage of a character string entered via the soft keyboard screen is described with reference to the flowchart in FIG. 5.

Figure 5:
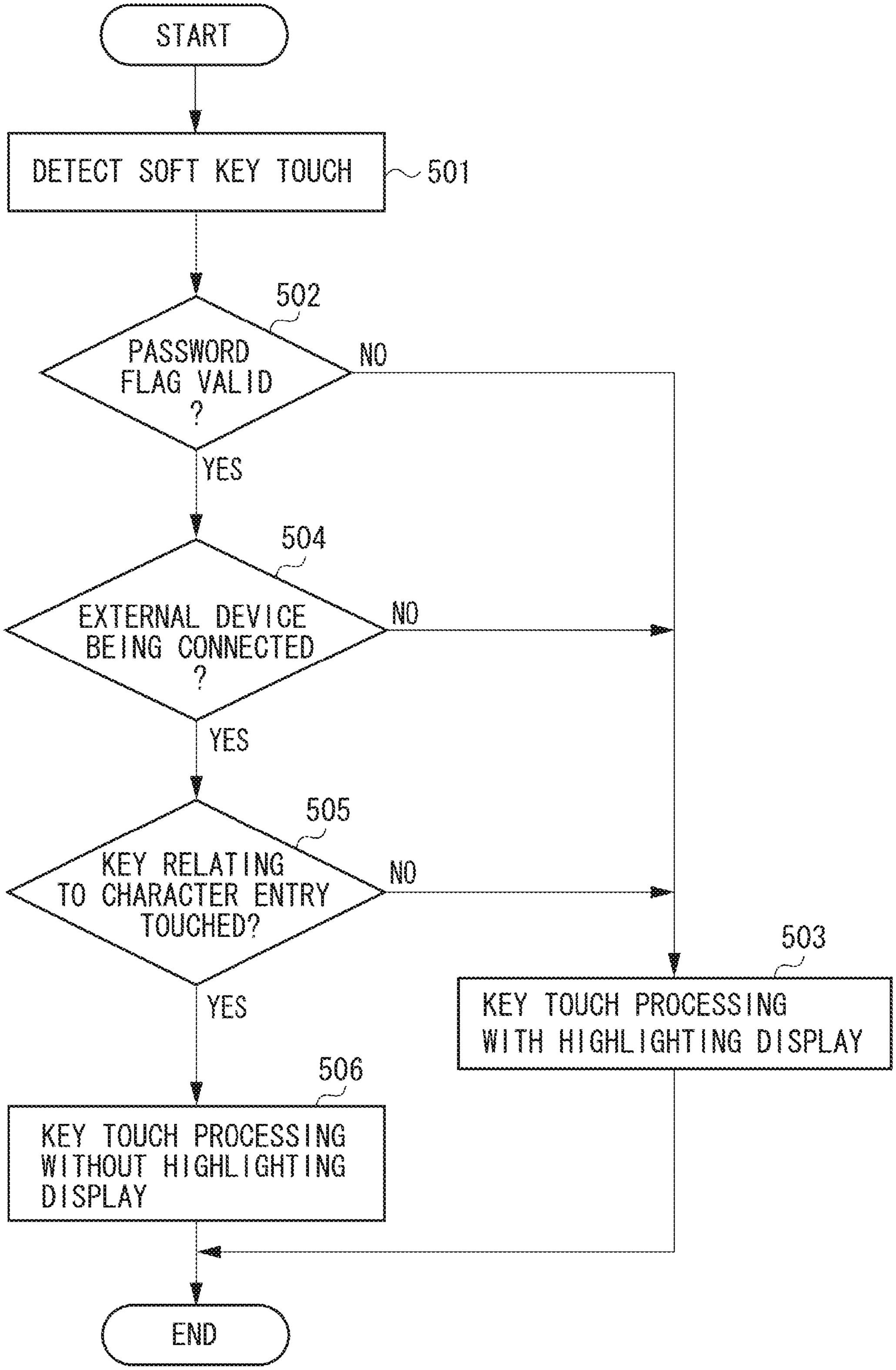
FIG. 5 is a flowchart illustrating processing for entering a character via a soft keyboard screen.

FIG. 5 is a flowchart illustrating an example of the processing performed by the server 100 according to the present exemplary embodiment. The flowchart in FIG. 5 illustrates processing performed when a character is entered via a soft keyboard screen. The individual steps in the flowchart are executed by the CPU 101 according to the program stored in the HDD 104.

In step S501, the CPU 101 detects a soft key touch on the soft keyboard screen. In step S502, the CPU 101 extracts a setting managed in association with the displayed soft keyboard screen, and determines whether a password flag is valid based on the extracted setting. In step S502, if the password flag is valid, the CPU 101 determines that the soft keyboard screen is a password keyboard, that is, a soft keyboard for entering a password is displayed.

In step S502, if the CPU 101 determines that the password flag is invalid (NO in step S502), then in step S503, the CPU 101 highlights the touched soft key and stores the entered character in the HDD 104 as normal soft key touch processing.

In step S502, if the CPU 101 determines that the password flag is valid (YES in step S502), then in step S504, the CPU 101 determines whether the client 113 is connected via the network I/F 108.

The determination in step S502 may be performed by a plurality of determination methods. In the present exemplary embodiment, when the client 113 accesses the server 100 and starts connection with the server 100, the server 100 stores information indicating that the client 113 is currently connected to the server 100 together with an Internet Protocol (IP) address of the client 113 in the HDD 104. The CPU 101 refers to the connection information stored in the HDD 104. If the connection information contains the information indicating that the client 113 is currently connected to the server 100, in step S504, the CPU 101 determines as YES.

If the client 113 makes a request to end the connection with the server 100, the server 100 ends the connection with the client 113, and deletes or invalids the connection information stored in the HDD 104. The CPU 101 may determine whether the connection from the client 113 is performed using a remote framebuffer (RFB) protocol. If the CPU 101 determines that the connection is performed using the RFB protocol, the CPU 101 can determine that the server 100 is being connected to the client 113.

In step S504, if the CPU 101 determines that the client 113 is not connected (NO in step S504), in step S503, the CPU 101 highlights the touched soft key as the normal soft key touch processing. In step S504, if the CPU 101 determines that the client 113 is currently connected (YES in step S504), in step S505, the CPU 101 determines whether the touched soft key is a soft key for displaying a character in the entered character display area 302.

In the present exemplary embodiment, the soft key used when a character is displayed in the entered character display area 302 in response to a soft key touch is hereinafter referred to as “character display key”. For example, a soft key to which a normal alphanumeric character is assigned is the character display key. Further, soft keys other than the character display key are hereinafter referred to as “special keys”. For example, the special keys include diacritical marks, such as [circumflex] and [umlaut], which are attached on an alphabet in European languages, and the like. In addition, the special keys include a Shift key, a BackSpace key, an Alt key, and the like.

The determination of whether a soft key is the character display key varies depending on the input mode of the soft keyboard screen or the key touch state. A specific example is described with reference to FIG. 3 (the soft keyboard screen displayed on the operation unit 106). FIG. 3 illustrates a state when the [ˆ] key is touched. ([ˆ] key is a key which is not displayed at the time it is touched and when a character display key is touched next, a character formed by combining the [ˆ] key with the character display key is displayed.) When the [ˆ] key is touched only once, nothing is displayed on the entered character display area 302. Accordingly, in this case, the [ˆ] key functions as the special key not as the character display key. However, if the [ˆ] key is touched twice in a row, "ˆˆ" is displayed in the entered character display area 302. Accordingly, in the state of the second touch of the [ˆ] key, the [ˆ] key of the second touch is exceptionally handled as the character display key.

In step S505, if the CPU 101 determines that the touched soft key is not the character display key (NO in step S505), then in step S503, the CPU 101 highlights the touched soft key as the normal soft key touch processing. On the other hand, if the CPU 101 determines that the touched soft key is the character display key (YES in step S505), the processing proceeds to step S506. In step S506, the CPU 101 performs the soft key touch processing without highlighting the touched soft key. More specifically, the CPU 101 stores the entered character in the HDD 104, and displays the character in the entered character display area 302.

According to the highlighting in step S503 or step S506, or the character display in the entered character display area 302, the image information on the operation unit 106 varies. In this step, if the client 113 is currently being connected, the image information is reflected to the operation unit 119 in the client 113 by the above-described processing of <Processing in change in operation unit 106 (processing in change in server)>.

Figure 6:
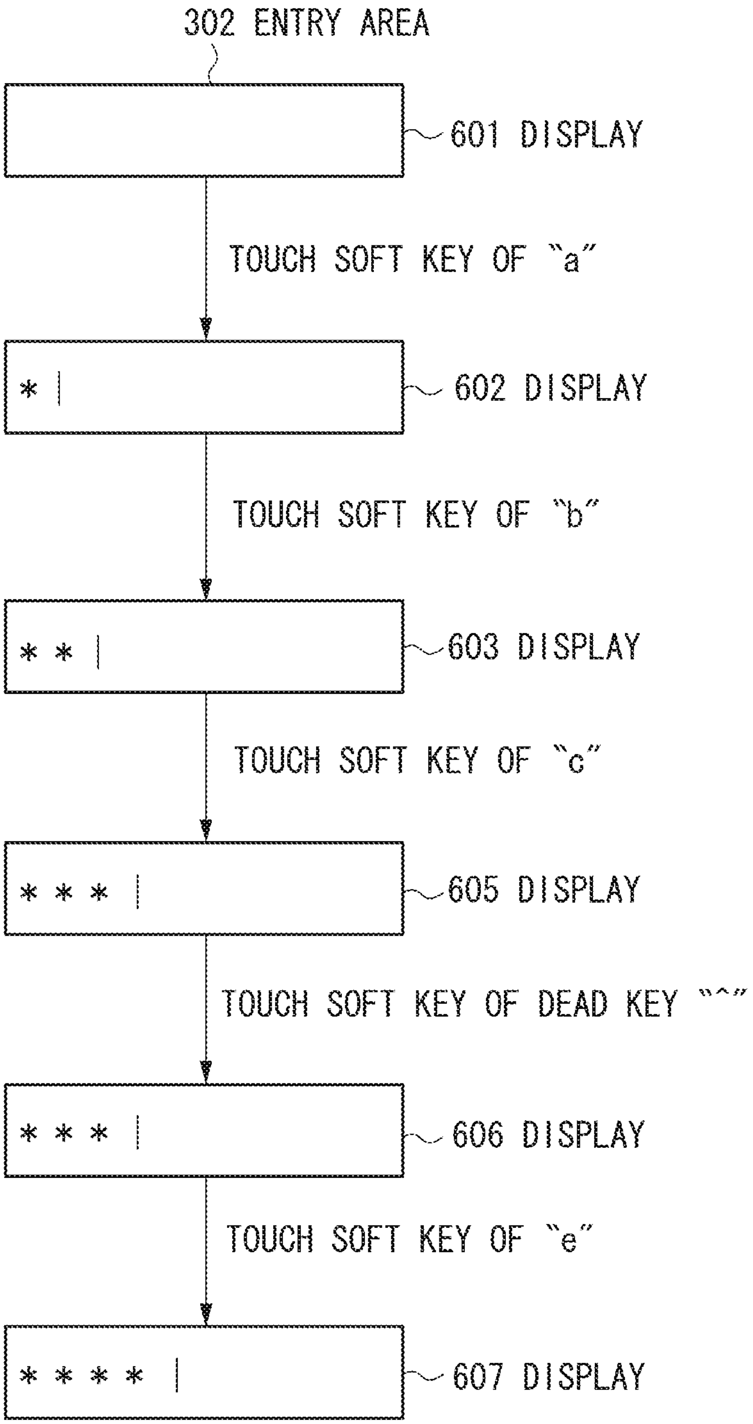
FIG. 6 is a conceptual scheme illustrating contents to be displayed on an entered character display area in the operation unit.

FIG. 6 illustrates a state in the entered character display area 302. First, a case where a user touches the soft key [a] that is one of the character display keys on the password soft keyboard screen displayed on the operation unit 106 in the server 100 is described. As in a state in a display 601 in FIG. 6, it is assumed that nothing is displayed at first in the entered character display area 302 on the soft keyboard screen displayed on the operation unit 106.

In a display 602, if the CPU 101 detects a touch of the soft key [a], the CPU 101 stores "a" as an entered character in the HDD 104, and displays "*" in the entered character display area 302. The above-described processing is performed when the soft key [a] is touched. When the soft key [a] that is one of the character display keys is touched, "*" is displayed in the entered character display area 302. Thus, without highlighting the soft key [a], the user can recognize that the character is entered.

After the entry of the soft key [a], if the user enters the [b] soft key, the CPU 101 performs processing similar to the entry processing of the soft key [a], and stores "ab" as the entered characters in the HDD 104. In a display 603, by the entry of the [b] soft key, the CPU 101 displays "" in the entered character display area 302** by adding one more "*" thereto.

A case where the user further enters the [c] soft key is described. In step S506 and in a display 605, if the CPU 101 detects a touch of the soft key, the CPU 101 stores "abc" as entered characters in the HDD 104, and displays "*" in the entered character display area 302**.

A case where the user further enters the [ˆ] soft key, which is a dead key, is described. When the CPU 101 detects a touch of the soft key, the CPU 101 determines that the dead key [ˆ] is the special key and not the character display key. Accordingly, the CPU 101 does not change the number of the soft keys "*" to be displayed at the time the dead key [ˆ] is entered. In step S503 and in a display 606, the CPU 101 highlights the [ˆ] soft key, and stores "abcˆ" as the entered characters in the HDD 104. In the case of the entry of the dead key, the CPU 101 stores "abcˆ" as the entered characters in the HDD 104, and further, stores the information that the last character "ˆ" is the dead key in the HDD 104.

A case where the user further enters the [e] soft key is described. In step S506 and in a display 607, if the CPU 101 detects a touch of the [e] soft key, the CPU 101 stores the following character string [Sequence 1] as an entered character in the HDD 104 without highlighting the [e] soft key, [Sequence 1]

abcê

In addition, "**" is displayed as mask information in the entered character display area 302**.

The entry of the "e circumflex (the alphabetic character with ˆ above e)" is similar to the entry of a common dead key. A table of combinations of a dead key and the following corresponding character is provided in advance in the HDD 104. Using the combination table, the CPU 101 extracts the "e circumflex (the alphabetic character with ˆ above e)" as the character corresponding to the soft key "ˆ" and the soft key "e".

The above-described processing is executed when the user touches the soft keys. The user may touch the soft keys on the operation unit 119 in the client 113. In such a case, as pre-processing of the step S501, the CPU 101 performs processing of converting the touch event in the client 113 received by the network I/F 108 into a touch event in the operation unit 106. The other processing performed by the server 100 is similar to those in FIG. 5.

As described above, when the server 100 is connected with the client 113 and the same operation screen is displayed on the displays of the both apparatuses, only the character display keys are not highlighted, and only the keys that are not to be character-displayed, for example, the dead key are highlighted. By this processing, while the user is entering a password on the server 100, even if another user is watching the display in the client 113, the user who is watching the display in the client 113 cannot recognize the entered password. Further, since the special key is highlighted, in the case where one character is entered by a plurality of times of soft key touch using the dead key, the user can confirm the entry of the character.

In other words, according to the present exemplary embodiment, when an alphabet with the circumflex (i.e., a character of combination of circumflex and an alphabet) in European languages is entered, the following operation is performed. For example, to enter a character [e circumflex] (i.e., an alphabetic character with a circumflex above [e]), the user touches the [ˆ] soft key first. At the time the [ˆ] soft key is entered, the CPU 101 does not switch the operation screen. Then, the user touches the [e] soft key. When the user operates the [e] soft key, the CPU 101 recognizes the [e circumflex] as one character, and displays the mask information [*] on the operation screen.

As described above, when an alphabetical soft key is touched, the CPU 101 does not perform the highlighting, and displays the mask information [*] in the character entry area on the operation screen. Consequently, an operator who operated the soft key can at least confirm that the soft key is properly touched. Further, a user at the external device side connected using the VNC cannot specify the entered character. On the other hand, if the [ˆ] soft key is touched, instead of not displaying the mask information [*] in the character entry area on the operation screen, the [ˆ] soft key is highlighted. Thus, the operator who operated the soft key can confirm that the [ˆ] soft key is touched.

In the first exemplary embodiment, by not performing the highlighting in response to a touch of a character display key (by the processing in step S506), leakage of confidential information such as a password can be prevented. In a second exemplary embodiment, another method for preventing the leakage of confidential information is described with reference to FIG. 7. Basic operations and control contents are similar to those in the first exemplary embodiment, and accordingly, only different points are described.

Figure 7:
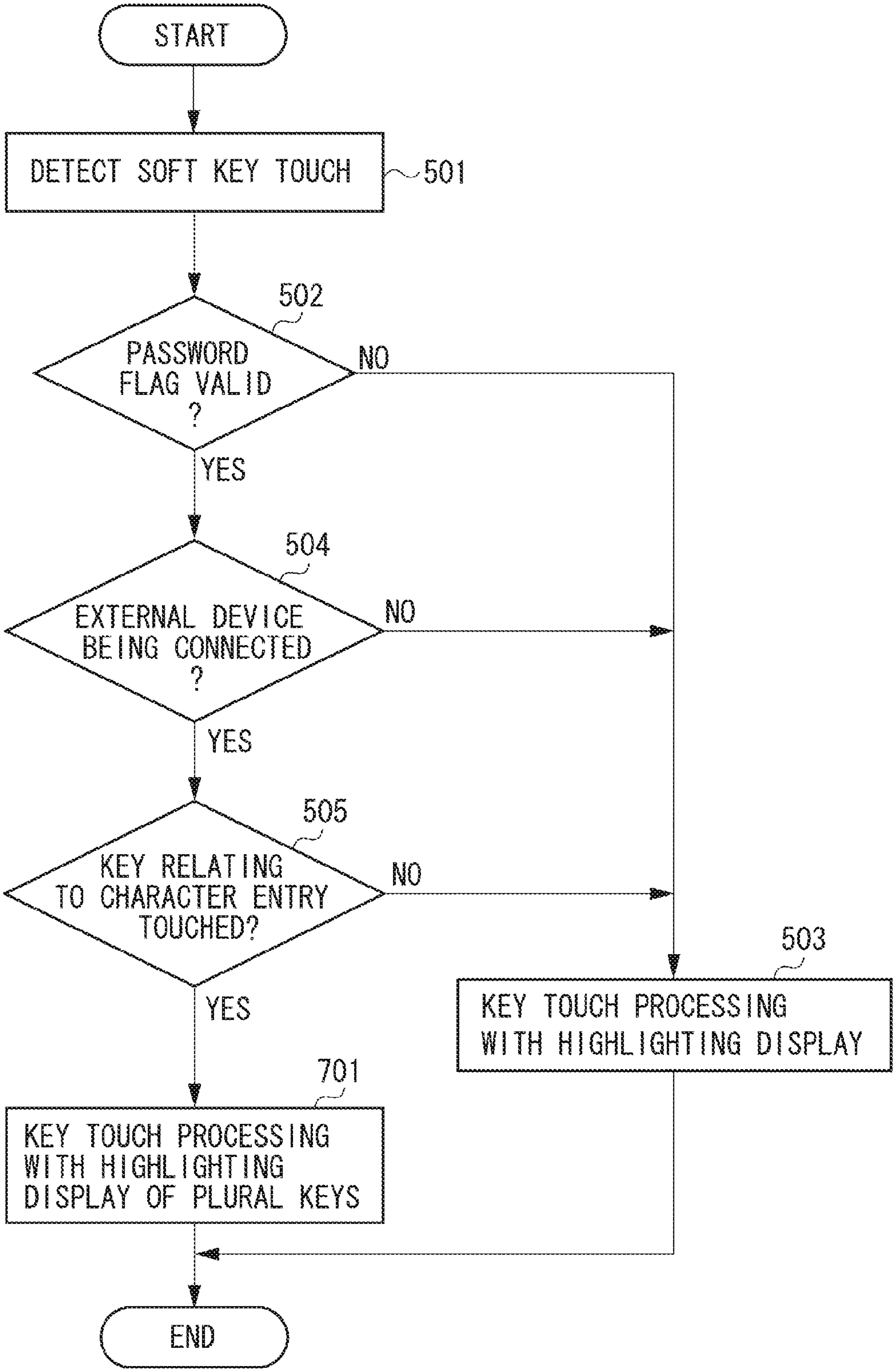
FIG. 7 is a flowchart illustrating processing for entering a password.

In step S505 in FIG. 7, if the CPU 101 determines that the touched soft key is not a character display key (NO in step S505), then in step S503, the CPU 101 highlights the touched soft key and stores a character corresponding to the touched character as a character string in the HDD 104. In step S505, if the CPU 101 determines that the touched soft key is the character display key (YES in step S505), the processing proceeds to step S701. In step S701, the CPU 101 acquires one or a plurality of soft keys associated with the touched soft key from the HDD 104. Then, the CPU 101 highlights the acquired soft key, and stores a character corresponding to the soft key touched in step S501 as a character string in the HDD 104.

A specific example of the processing is described below. It is assumed that combinations of a soft key and a plurality of associated soft keys are stored in the HDD 104, as illustrated in FIG. 8.

A case is described in which a user touches the soft key [a] on the password soft keyboard screen displayed on the operation unit 106 in the server 100 when the client 113 is connected to the server 100. As in a state in the display 601 in FIG. 6, it is assumed that nothing is displayed at first in the entered character display area 302 on the soft keyboard screen displayed on the operation unit 106.

In step S501, the CPU 101 detects a touch of a soft key. Then in step S502, the CPU 101 determines whether the password flag in the HDD 104 is valid. In this example, the password flag is valid (YES in step S502), thus in step S504, the CPU 101 determines whether the client 113 is currently being connected. Since the client 113 is connected in this example, in step S505, the CPU 101 determines whether the touched soft key is a character display key. The processing so far is similar to that in the first exemplary embodiment.

Figure 9:
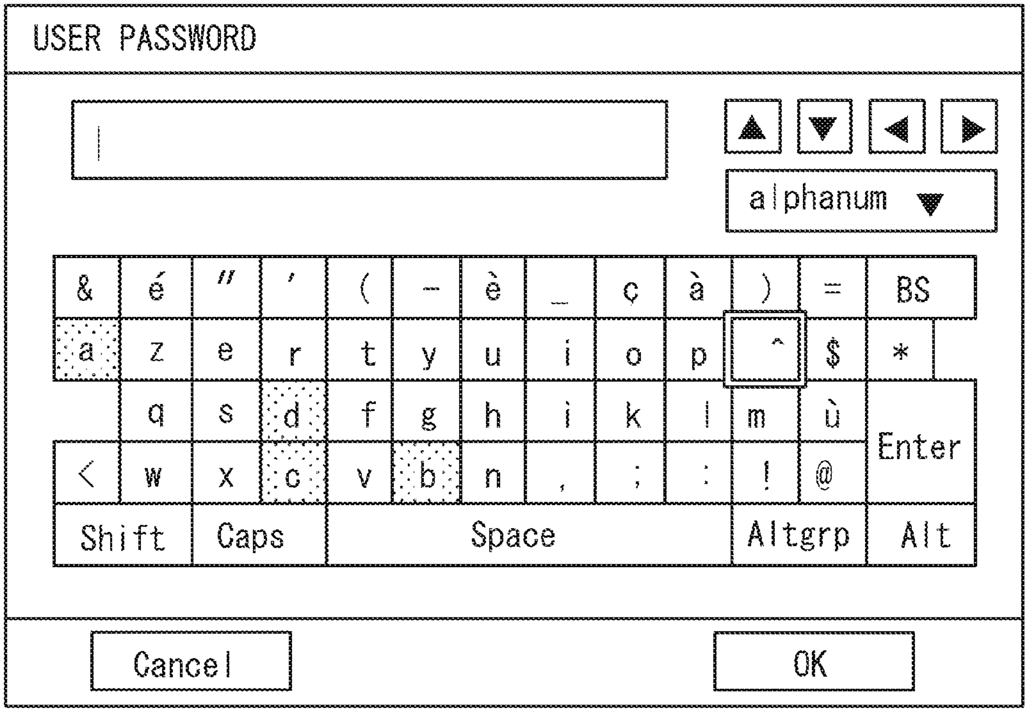
FIG. 9 illustrates a display example of highlighting of a soft key.

In step S505, the CPU 101 determines that the character display key is touched (YES in step S505), and detects soft keys of [a], [b], [c], and [d] as keys associated with the soft key [a] from the HDD 104. All the detected soft keys are highlighted. By highlighting all of the soft keys of [a], [b], [c], and [d], the operation unit 106 displays a screen as illustrated in FIG. 9. Soft key touch processing other than the highlighting, for example, the processing for storing an entered character in the HDD 104, is similar to that in the first exemplary embodiment, and accordingly, the description is omitted. In the present exemplary embodiment, as the key associated with the soft key [a], the soft keys of [a], [b], [c], and [d] are detected. Alternatively, a soft key that is not associated with the touched [a] soft key may be extracted at random.

According to the above-described method, even if a user is watching the operation unit 119 in the client 113, the user cannot exactly specify which key of the soft keys of [a], [b], [c], and [d] is touched. As a result, the security can be increased. Further, the user who touches a soft key on the operation unit 106 in the server 100 can recognize that the soft key touch is properly performed since the touched soft key is highlighted. Consequently, the operability can be increased.

Figure 10:
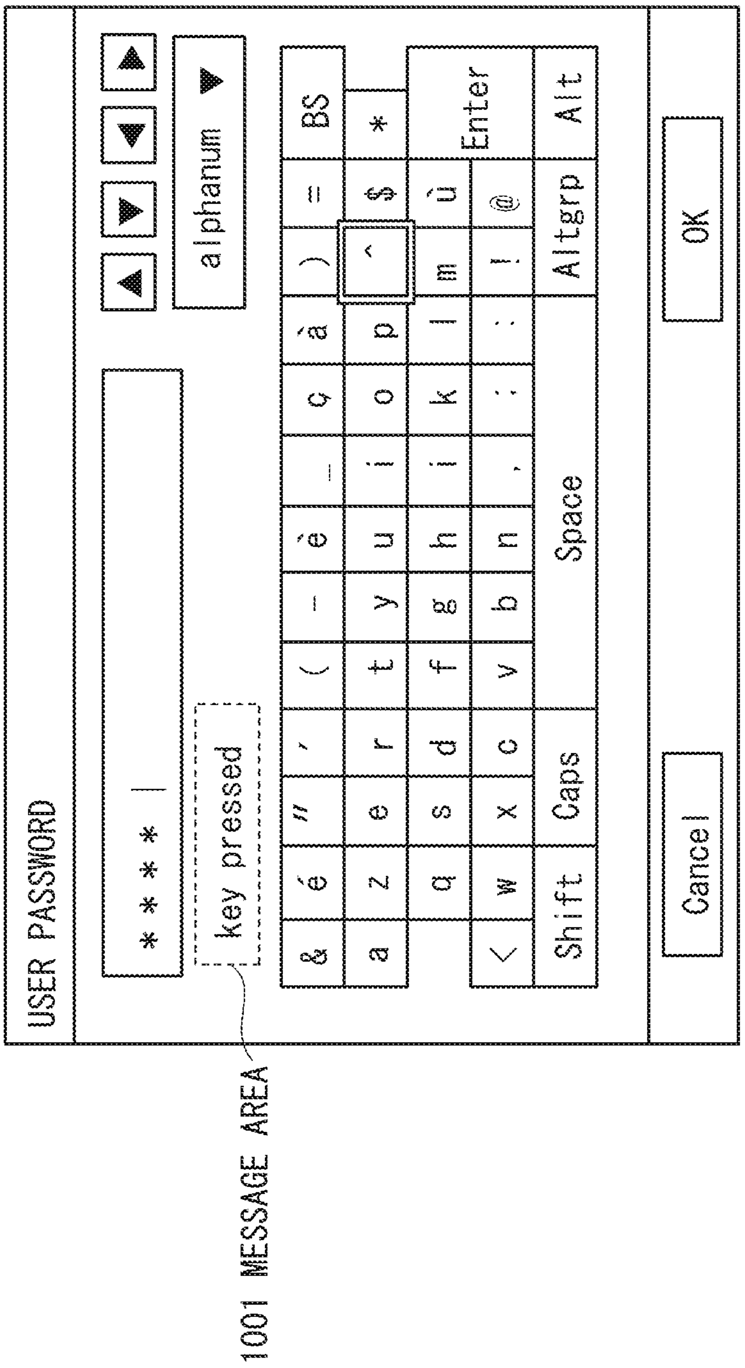
FIG. 10 illustrates a display example of highlighting on a screen of the operation unit.

The key associated with a touched soft key is uniquely specified, and the same associated soft key can be always highlighted if any soft key is touched. Alternatively, instead of highlighting the associated key in response to the touch of a soft key, as illustrated in FIG. 10, a message such as "Key pressed" can be displayed in a message area 1001 for the user to indicate that the key is properly touched. Further, not only display either one of the highlighting of the soft key and the display in the message area, but both of the processes may be performed to indicate that the key is properly touched.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-105414 filed May 10, 2011, which is hereby incorporated by reference herein in its entirety.

What is claimed is:

1. An information processing apparatus comprising:

a display device that displays a software keyboard for inputting a password and an input character area for displaying a character input by using the software keyboard, the software keyboard including a character input key for inputting a character and an assist key for assisting input of the character input key;

a transmission device that transmits data for causing a remote apparatus to display a software keyboard which is the same as the software keyboard displayed on the display device, to the remote apparatus, by using virtual network computing (VNC);

a memory that stores a character input using the software keyboard, wherein in accordance with a single touch of the character input key, a character corresponding to the touched character input key is stored as an inputted character in the memory, and in accordance with a single touch of the character input key which follows a single touch of the assist key, a combination of a character corresponding to the touched character input key and a symbol corresponding to the assist key is stored as a inputted character in the memory; and a controller that controls the display device to display on the input character area, in accordance with the single touch of the character input key, a predetermined character that differs from a character corresponding to the touched character input key, wherein the controller controls the display device to not display the predetermined character on the input character area in accordance with the single touch of the assist key, and controls the display device to display the predetermined character on the input character area in accordance with the single touch of the character input key which follows the single touch of the assist key, wherein the controller controls the display device to display the input character display area so that a cursor is moved in accordance with the single touch of the character input key, wherein the controller controls the display device to, while the information processing apparatus is not connected to the remote apparatus using the VNC, change, in accordance with the single touch of the character input key, a display form of the touched character input key and change, in accordance with the single touch of the assist key, a display form of the touched assist key, and wherein the controller controls the display device to, while the information processing apparatus is connected to the remote apparatus using the VNC, change, in accordance with the single touch of the assist key, the display form of the touched assist key and not change, in accordance with the single touch of the character input key, the display form of the touched character input key.

2. The information processing apparatus according to claim 1, wherein the character input key is a key to which an alphanumeric character is assigned.

3. The information processing apparatus according to claim 1, wherein the assist key is a dead key.

4. The information processing apparatus according to claim 1, wherein the assist key is at least one of a Shift key, a BackSpace key, and an Alt key.

5. The information processing apparatus according to claim 1, wherein the controller controls the display device to highlight a plurality of keys in accordance with a single touch of the character input key while the information processing apparatus is connected to the remote apparatus using the Virtual Network Computing.

6. The information processing apparatus according to claim 1, wherein the changing of the display form of the touched character input key or assist key is a process for temporarily changing a position of the touched character input key or assist key.

7. The information processing apparatus according to claim 1, wherein the changing of the display form of the touched character input key or assist key is a process for changing color of the touched character input key or assist key.

8. The information processing apparatus according to claim 1, wherein the changing of the display form of the touched character input key or assist key is a process for, instead of displaying an image indicating the touched character input key or assist key, temporarily displaying another image and then displaying the image indicating the touched character input key or assist key.

9. The information processing apparatus according to claim 1, wherein the character corresponding to the touched character input key is an alphabetical character, and the symbol corresponding to the assist key is a circumflex or a umlaut.

10. The information processing apparatus according to claim 1, wherein the data transmitted by the transmission device includes data for causing the remote device to display an input character area which is substantially same as the input character area displayed on the display device.

11. The information processing apparatus according to claim 1, wherein the display device displays another software keyboard for inputting a character other than for a password, wherein when the other software keyboard is being displayed, the controller changes a display form of the touched character input key and a display form of the touched assist key regardless of whether or not the information processing apparatus is connected to the remote apparatus using the Virtual Network Computing.

12. A method for controlling an information processing apparatus, the method comprising:

displaying, by a display device of the information processing apparatus that displays a software keyboard for inputting a password and an input character area for displaying a character input by using the software keyboard, the software keyboard including a character input key for inputting a character and an assist key for assisting input of the character input key;

transmitting, by a transmission device, data for causing a remote apparatus to display a software keyboard which is the same as the software keyboard displayed on the display device, to the remote apparatus, by using virtual network computing (VNC);

storing, by a memory, a character input using the software keyboard, wherein in accordance with a single touch of the character input key, a character corresponding to the touched character input key is stored as an inputted character in the memory, and in accordance with a single touch of the character input key which follows a single touch of the assist key, a combination of a character corresponding to the touched character input key and a symbol corresponding to the assist key is stored as a inputted character in the memory;

controlling, by a controller, the display device to display on the input character area, in accordance with the single touch of the character input key, a predetermined character that differs from a character corresponding to the touched character input key;

controlling, by the controller, the display device to not display the predetermined character on the input character area in accordance with the single touch of the assist key, and controlling the display device to display the predetermined character on the input character area in accordance with the single touch of the character input key which follows the single touch of the assist key; controlling, by the controller, the display device to display the input; character display area so that a cursor is moved in accordance with the single touch of the character input key; controlling, by the controller, to control the display device to, while the information processing apparatus is not connected to the remote apparatus using the VNC, in accordance with the single touch of the character input key, a display form of the touched character input key and change, in accordance with the single touch of the assist key, a display form of the touched assist key; and controlling by the controller, to control the display device to, while the information processing apparatus is connected to the remote apparatus using the VNC, change in accordance with the single touch of the assist key, the display form of the touched assist key and not change, in accordance with the single touch of the character input key, the display form of the touched character input key.

* * * * *